(No Model.)  F. H. CHASE.  5 Sheets—Sheet 3.
RAISIN SEEDER.
No. 584,671.  Patented June 15, 1897.
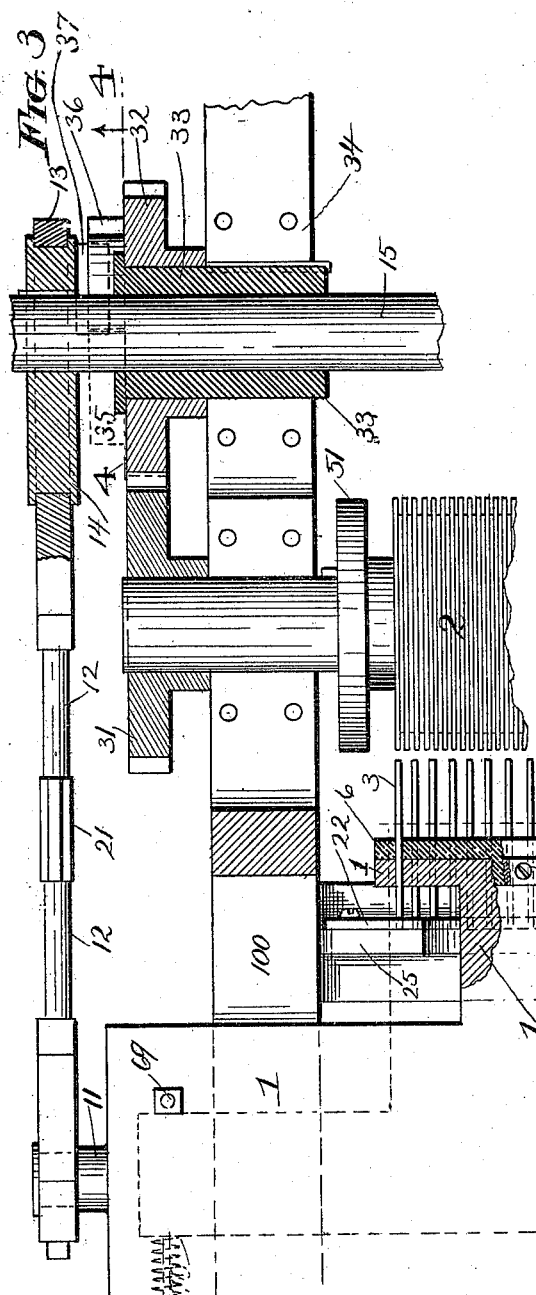
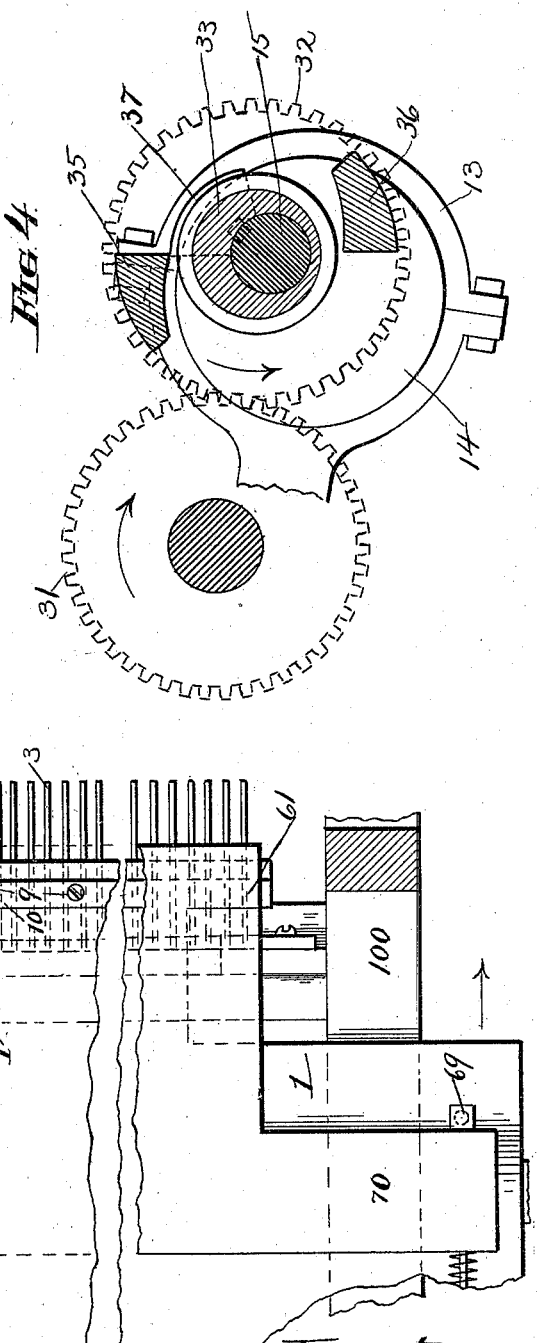
Witnesses
J. Halpenny
J. Cross
Inventor:
Frank H. Chase
By his attorneys
Curdy & Hopkins (No Model.) 5 Sheets—Sheet 4.
F. H. CHASE.
RAISIN SEEDER.
No. 584,671. Patented June 15, 1897.
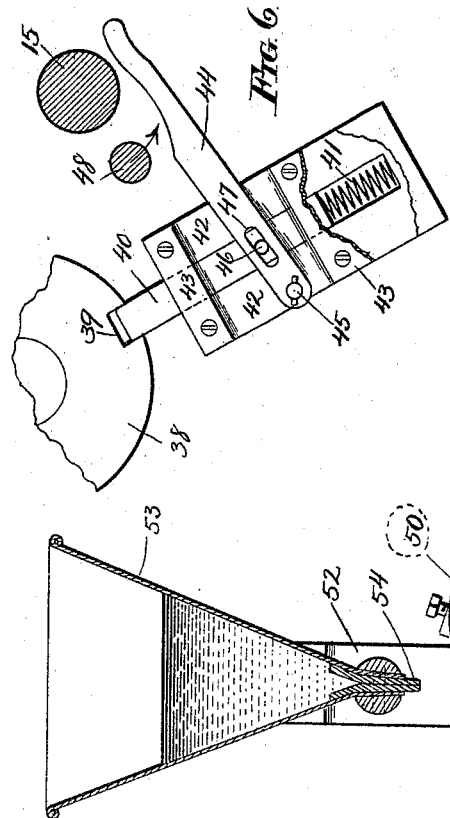
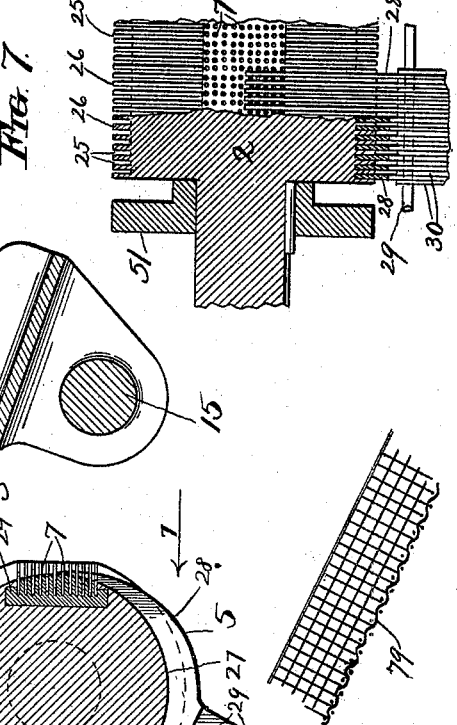
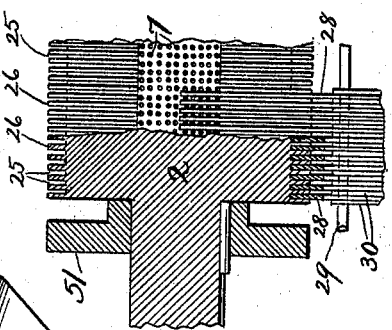
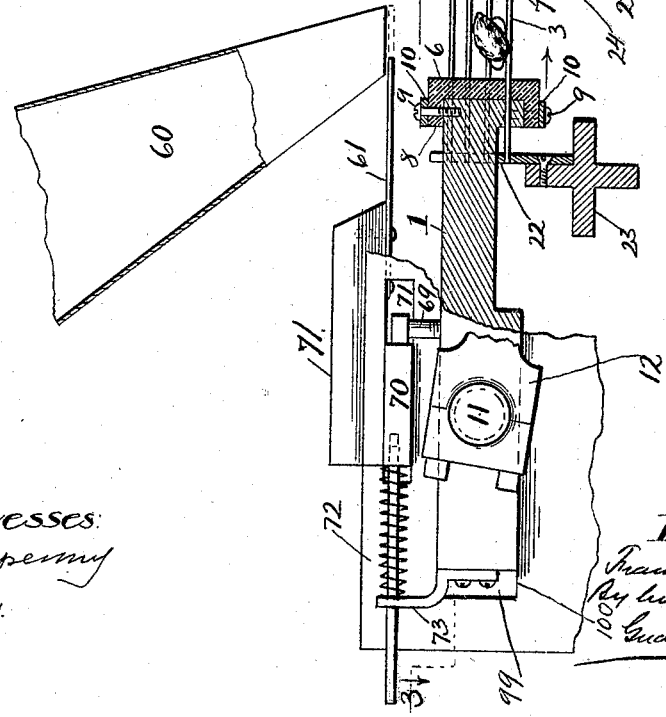
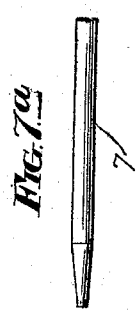
Witnesses:
J. Halpenny
J. Cross
Inventor
Frank H Chase
By his attorneys
Gualey & Hopkins
THE NORRIS PETERS CO., PHOTO-LITHO., WASHINGTON, D. C.

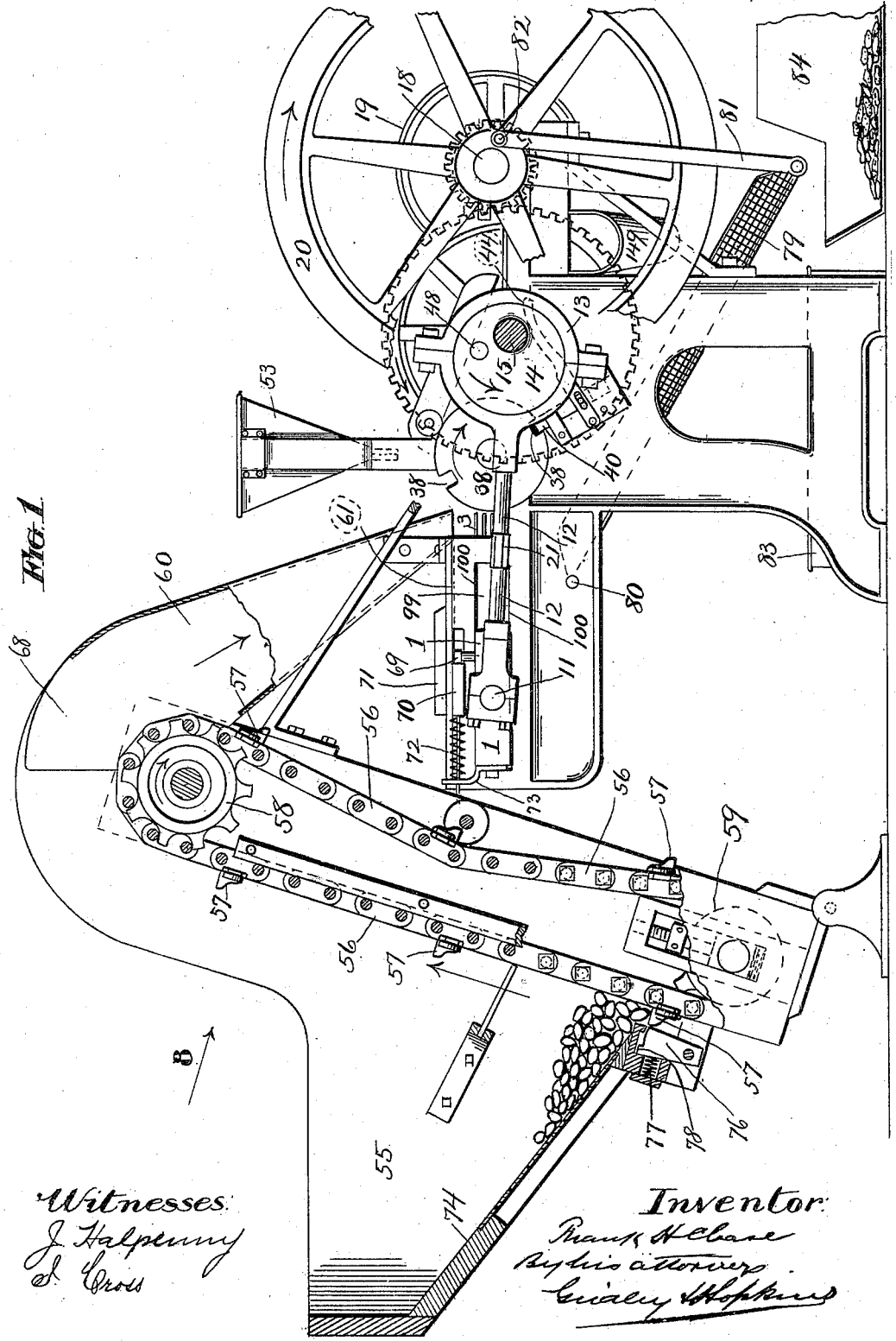

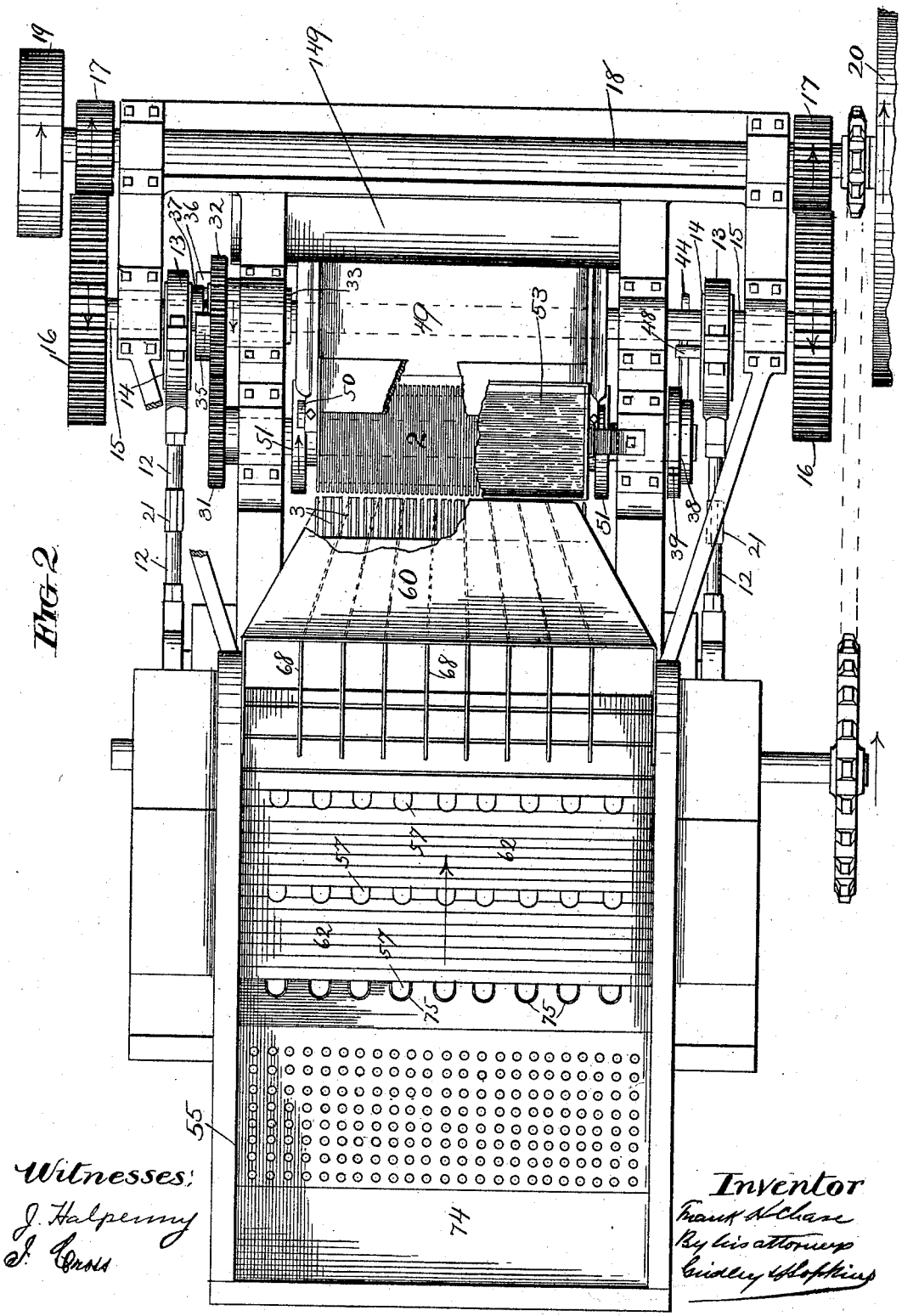

(No Model.) 5 Sheets—Sheet 5.
F. H. CHASE.
RAISIN SEEDER.

No. 584,671. Patented June 15, 1897.

Witnesses.
J. Halpenny
J. Cross

Inventor:
Frank H. Chase
By his attorneys
Cidley & Hopkins

THE NORRIS PETERS CO., PHOTO-LITHO., WASHINGTON, D. C.

UNITED STATES PATENT OFFICE.

FRANK H. CHASE, OF CHICAGO, ILLINOIS.

RAISIN-SEEDER.

SPECIFICATION forming part of Letters Patent No. 584,671, dated June 15, 1897.

Application filed May 15, 1896. Serial No. 591,608. (No model.)

*To all whom it may concern:*

Be it known that I, FRANK HOWARD CHASE, a citizen of the United States, residing at Chicago, in the county of Cook and State of Illinois, have invented certain new and useful Improvements in Raisin-Seeders, of which the following is a specification, reference being had to the accompanying drawings, which are made a part hereof, and in which—

Figure 8:
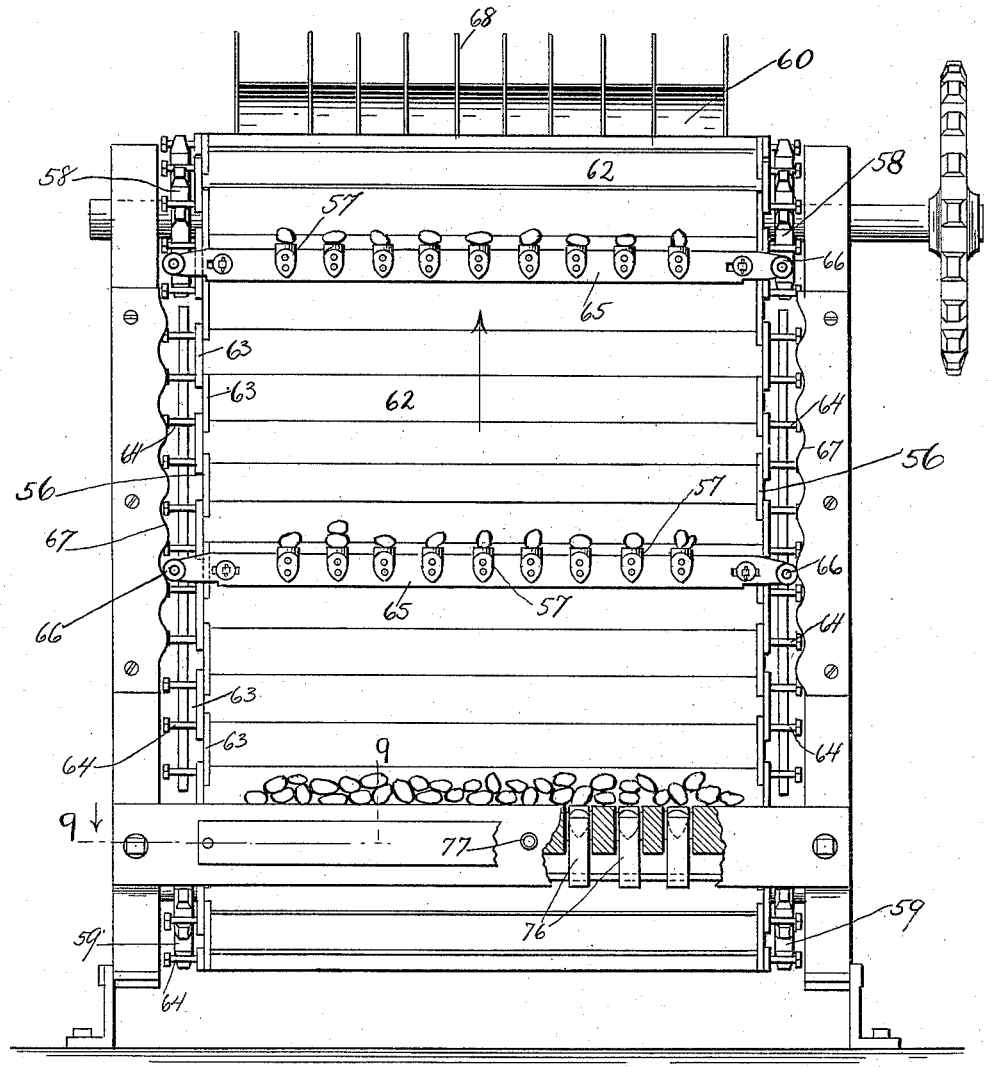
Figure 9:
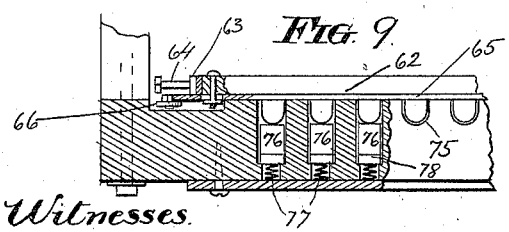
Figure 10:
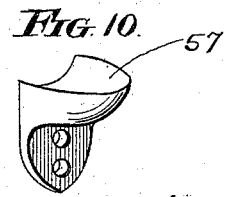

Figures 1 and 2 are respectively a side elevation and a plan view of a raisin-seeder embodying the invention, some of the parts being broken away. Fig. 3 is a view, partly in plan and partly in horizontal section, of some of the parts on a larger scale. Fig. 4 is a vertical section of some of the parts on the line 4 4, Fig. 3, looking in the direction of the arrow. Fig. 5 is a view showing some of the parts in vertical longitudinal section and others in side elevation. Fig. 6 is a detail view showing the dogging mechanism. Fig. 7 is a view showing, partly in section and partly in elevation, a portion of one of the pulp-receivers, a portion of the intermittently-movable part by which it is carried, a portion of the pulp-ejector, and the cam for controlling the position of the seed-scraper. Fig. 8 is an elevation of the feeder, viewed in the direction of the arrow 8, Fig. 1. Fig. 9 is a section of a portion thereof on the line 9 9, Fig. 8. Fig. 10 is a perspective view of one of the cups or buckets of the feeder.

In the machine shown in the drawings there is a reciprocating plunger 1, carrying one of the seeding devices, and a part 2, carrying the coöperating seeding device or a plurality of them, a cradle 3, by which the fruit is supported between the seeding devices in position to be acted upon by them, a feeder by which the fruit is fed to the cradle, a seed-scraper 4, by which the seeds are removed, and a pulp-ejector 5, by which the pulp is ejected. The seeding device which is carried by the plunger consists of an elastic pad 6, and the seeding device which is carried by the part 2 consists of a pulp-receiver 7. This part 2 preferably consists of a cylinder mounted to rotate about its axis, and means hereinafter described are provided for rotating it intermittently, so that first one and then another of the pulp-receivers will be brought to a position opposite the plunger, so that when the plunger is advanced, by means hereinafter fully described, the fruit that is in the cradle will be pressed against the pulp-receiver with sufficient force to cause the pulp to enter the interstices of the pulp-receiver, while the seeds will remain on the outer surface thereof, the elasticity of the pad 6 being such as will produce these results.

The several parts are so constructed and arranged with relation to each other and their movements are so timed that they will operate as follows: An instant after the plunger in making its backward stroke withdraws the impaling device 6 from contact with the pulp-receiver the part 2, carrying the pulp-receiver, will be set in motion in the direction of the arrow placed upon it in Figs. 1, 4, and 5. As the pulp-receiver passes the seed-scraper 4 the seeds will be removed. As the plunger is about to complete its backward stroke the feeder will drop into the cradle another charge of fruit to be seeded. The plunger then commences its forward stroke, and when it has made, say, about one-quarter of it another one of the pulp-receivers will have reached a position opposite it and the movement of the part 2 will be arrested. The second charge of fruit will then be impaled, after which the plunger will again be withdrawn and the part 2 again set in motion. As it proceeds the seeds of the second charge are scraped off in the manner already described, and the pulp-receiver which received the pulp of the first charge reaches and passes the pulp-ejector 5, by which the pulp is discharged. Stated thus, in general terms the operation of the machine which forms the subject of the present invention is similar to the operation of the machine which is shown and described in my pending application, filed June 13, 1895, Serial No. 552,672.

The object of the present invention is to provide a machine of the same general type as the one shown and described in said application, but which is better adapted for seeding raisins in large quantities. To this end I have so constructed the coöperative seeding devices that they may be made of any desired capacity. I have changed the character of the movable part by which the pulp-receivers are carried in order to better adapt it for sustaining the increased pressure that will be put upon it as an incident of the increased capacity of the machine. I have changed the character of the feeder in order to adapt it to feed a number of raisins to the cradle at each operation and at the same time avoid, as far as possible, having the raisins fall one behind another, and I have changed the character of the pulp-ejector.

The elastic impaling device 6 consists of a block of rubber having its back recessed in order to receive the head of the plunger 1 and provide flanges 8, that fit against the sides of the head of the plunger and are secured thereto by screws 9, strips 10 of metal being interposed between the heads of the screws and the flanges 8 in order to more securely hold the latter in place. The plunger itself consists of a heavy plate which extends from side to side of the machine, and near its ends passes through horizontal slots 99, with which the frame is provided, said slots resulting in upper and lower guides 100, which confine the plunger to a strictly horizontal movement. At its extremities it is provided with wrist-pins 11, to which are pivotally connected the rear ends of pitmen 12, the forward ends of which carry straps 13, that embrace eccentrics 14, fixed to a shaft 15. This shaft is provided at its ends with gear-wheels 16, meshing with pinions 17, carried by the main shaft 18 of the machine, the latter being provided at one end with a pulley 19 for receiving a driving-belt and at the other end with a fly-wheel 20. In order to enable the proper adjustment of the plunger with relation to the other parts of the machine, each of the pitmen is formed in two parts united by a turn-buckle 21, by turning which the length of pitmen may be adjusted at will.

The cradle 3 consists of a number of pins, all of which are secured at one end to a plate 22, which in turn is secured to a part 23 of the frame. These pins all pass through perforations formed through the head of the plunger and through the pad 6 in the manner and for the purpose described in my application aforesaid. In fact, the cradle shown in the present application does not differ from the one shown in my former application excepting in that it is made of greater width in order to receive side by side a number of raisins, instead of being made of approximately U shape, in order to receive only a single raisin.

Each of the pulp-receivers is made up of a number of pins set over an area at least as great as the area of the fruit to be seeded and with intervening spaces that are insufficient to admit the seeds. These pins are set in a backing 24 of Babbitt metal or any other suitable material in the manner described in my application aforesaid, and this backing in turn fits in an undercut groove or recess formed in the part 2. Preferably all of the pins of which the pulp-receiver is made up terminate in the same plane and are so related to the part 2 that the extremities of the top and bottom pins of the receiver are flush with the outer surface of said part, as shown more clearly in Fig. 5. Preferably also these pins taper toward their outer extremities, as shown more clearly in Fig. 7ª. The advantage in using a pin of small diameter is that it will perforate the fruit more easily than a pin of larger diameter will, and the advantage in using a pin of large diameter is that it will more successfully withstand the pressure that is put upon it, and by making the pin of graduated diameter I am enabled to secure the advantages of pins of both of these classes.

The part 2 preferably takes the form of a cylinder—that is to say, between the pulp-receivers it is of cylindrical shape. Its periphery is provided with a number of circumferential grooves 25, resulting in circumferential ribs 26, and the pins of the pulp-receivers are so disposed that they will lie in the planes of these ribs, as shown more clearly in Fig. 7. This construction enables me to use a pulp-ejector consisting of a number of tapering blades of sheet metal which occupy the grooves of the cylinder, as shown more clearly in Figs. 5 and 7. On its inner face 27 each of these blades is constructed upon a curve of the same radius as is the bottom of the groove in which it fits, and upon its outer surface 28 it is constructed upon a curve which results in a gradual taper. The shank of each of the blades is provided with two perforations through which pass rods 29, and the spaces between these shanks are filled with Babbitt metal, as shown more clearly in Fig. 7, whereby the blades are permanently held in proper positions with relation to each other.

I am aware that it has been proposed to construct a pulp-receiver of a cylinder having pins set over its entire surface, said pins being radial with respect to the cylinder and disposed in circumferential rows; but I am not aware that it has ever been proposed to construct a pulp-receiver of a number of parallel pins and to so arrange these pins upon a part movable about an axis that they will occupy positions that are transverse to said axis.

In the machine shown and described in my application aforesaid the pulp-receiver is made up of a number of parallel pins and is carried by a part movable about an axis, but the pins are so disposed that they occupy positions parallel with said axis.

The construction shown in my application aforesaid may be successfully used, but it is not preferred, especially where the pulp-receiver is of considerable length.

The construction shown in the present application has many advantages over it, among which may be mentioned its compactness and its more equal and uniform distribution of the strains.

Referring to Fig. 5, it will be seen that the strains are directly against the axis of the movable part, and this part being sustained by suitable journal-boxes at both ends it follows that the pulp-receiver may be made of any desired length.

Where the pulp is impaled on a pulp-receiver in the manner described, the seeding of the fruit involves three separate and distinct operations, and these operations must be carried on in succession—that is to say, the pulp must first be impaled upon the pulp-receiver, the seeds must then be dislodged from the surface of the pulp-receiver, and the pulp must then be ejected from the pulp-receiver. The performing of each of these three operations requires a certain length of time, and if the parts of the machine by which any two of them are performed remain at rest while the third is being performed much time will be lost. It is in order to save this time that I use a plurality of pulp-receivers so arranged with relation to the other parts that the operation of impaling the raisins goes on without any interruption save the interruption which is incident to the bringing of the pulp-receivers successively into operative position and the reciprocation of the plunger. In the drawings I have shown two pulp-receivers, but I desire to have it understood that a greater or less number may be used. If only a single pulp-receiver is used, only some of the advantages of my invention will be attained; but if more than two be used none of the advantages will be lost.

In the operation of the machine it is necessary that the pulp-receivers should have an interval of rest in order to allow time for the pulp to be impaled. It is for this reason that the part 2, by which the pulp-receivers are carried, is given an intermittent movement, the extent of which will depend upon the number of pulp-receivers used. Where two are used, located at equal distances apart, it is necessary to move the part 2 through one-half of a complete revolution at each operation. In order to do this, its journal is provided with a pinion 31, meshing with the pinion 32, which is mounted to turn upon a sleeve 33, that is immovably fixed to a part 34 of the frame. The pinion 32 carries two tappets 35 36, whose working faces are exactly one hundred and eighty degrees apart and are adapted to be engaged by a single tappet 37, carried by one of the eccentrics 14. As before stated, the eccentric 14 is secured to the shaft 15, and this shaft passes through the sleeve 33, but not concentrically. It is eccentric with relation to the sleeve, and consequently is eccentric with relation to the pinion 32. As a result of this arrangement the working faces of the tappets 35 36 will move in circles that are eccentric with relation to the axis about which the tappet 37 moves, the parts being so proportioned and arranged that during each revolution of the shaft 15 the tappet 37 will engage one or the other of the tappets 35 36 and remain in engagement therewith during one-half of said revolution. For example, referring to Fig. 4, the tappet 37 has just moved out of engagement with the tappet 35. There is therefore no connection between the shaft 15 and the pinion 32, and consequently the pinion will remain at rest until the shaft 15 moves through one-half of a complete revolution, whereupon it will come in contact with the working face of the tappet 36. During the next half-revolution the tappets 35 and 36 will remain in engagement and the pinion 32 will partake of the movement of the shaft 15, the disengagement of the tappets 36 and 37 taking place when the tappet 36 reaches the position which the tappet 35 is shown as occupying. I have shown this mechanism for transmitting motion intermittently as embodied in a fruit-seeder, but I desire to have it understood that I reserve the right to embody this feature of my invention in any machine for any purpose in which it may be found useful.

When the part 2 is set in motion in order to change the positions of the pulp-receivers, it acquires considerable momentum, and in order that it may be arrested when the pulp-receiver reaches the proper position I provide a dogging mechanism, which is shown in Figs. 1, 2, and 6. This dogging mechanism consists of a circular disk 38, having in its periphery notches 39, corresponding in number with the number of pulp-receivers, adapted to receive a bolt 40, which is given a normal tendency to engage the notches by means of a coiled spring 41. The bolt is mounted to slide in a socket formed in a casting 42, and is held in place therein by plates 43, the spring 41 being contained in the socket and arranged to bear in one direction against the casting and in the other direction against the end of the bolt. To the casting a lever 44 is pivoted at 45, and from the bolt projects a pin 46, which occupies a slot 47 in the lever, so that when the lever is moved about its fulcrum the bolt will be moved endwise. The free end of the lever projects into the path of a pin 48, which is carried by one of the eccentrics 14, the position of the pin and the normal position of the lever being such that the pin will engage the lever and move it far enough to withdraw the bolt an instant before the tappet 37 engages the tappet 35 or 36, as the case may be. An instant after this engagement takes place, allowing sufficient time to move the part 2 far enough to carry the notch out of the path of the bolt, the pin 48 disengages the lever 44 and the spring 41 forces the bolt into engagement with the periphery of the disk 38 in readiness to enter the next notch 39.

The seed-scraper 4 in order to be effective must follow the working surfaces of the part 2 and of the pulp-receivers. In order to accomplish this, the scraper is secured to a support 49, which has rocking bearing upon the shaft 15 and is provided with adjustable rollers 50, through the medium of which it bears upon cams 51, that are secured to the shaft of the part 2, said cams being provided with flat surfaces so disposed that they permit the seed-scraper to move toward and from the axis of the part 2 while the pulp-receivers are passing it. The part 49 is in its nature a chute, over which the seeds pass and from which they fall into a second chute 149, from which they are discharged at the side of the machine.

Rising from the frame are two standards 5, which support a tank 53, containing water. The bottom of this tank is closed by means which will permit the water to be discharged drop by drop onto the part 2. For permitting this slow discharge of the water I may use a strip or strips of felt, or any other porous material, which is clamped between the contracted sides of the tank and thereby held in place. This tank is of the same length as the pulp-receivers, and its object is to keep the machine lubricated.

In order to properly seed raisins, it is necessary to avoid as far as possible having the raisins fall one behind another. I have therefore provided a feeder of such construction that each time the plunger is withdrawn it will drop into the cradle a number of raisins which, as nearly as possible, will be disposed side by side in a single row. This feeder consists of a hopper 55, in which the raisins to be seeded are placed, an endless apron 56, having buckets 57, sprocket-wheels 58 59, over which the apron travels, a chute 60, into which the raisins that are carried up by the buckets are discharged, and a valve 61, located at the bottom of the chute and only a short distance above the cradle, by which the raisins are arrested and held until the proper time for discharging them into the cradle. The apron is made up of a number of slats 62, preferably of wood, to the ends of which are secured overlapping plates 63, which are pivotally connected to each other by pins 64, that project across the planes of the sprocket-wheels 58 59. The buckets 57 are arranged in a number of equidistant series or rows. All the buckets of each series or row are secured to a bar 65, which in turn is secured to the apron, so as to be capable of endwise reciprocation. At its ends the bar projects beyond the apron and carries antifriction-rollers 66, which engage cams 67, that are secured to the sides of the hopper, so that as the apron moves in the direction of the arrow the rollers 66 will follow the surfaces of the cam 67 and the bar 66 will be given an endwise jigging movement. The object of this is to dislodge from each of the buckets all but one raisin. The raisins thus carried up are discharged into the chute 60, and in order to prevent their falling together the interior of the chute is divided by partitions 68 into as many compartments as there are buckets in each series. The parts are so timed that at the instant the buckets discharge into the chute the lower end of the hopper is closed by the valve 61, so that when the raisins reach this point they are arrested. They are here held within a very short distance of the cradle until the plunger, in making its backward stroke, withdraws the valve to the position shown in Fig. 5. This it does through the medium of studs or pins 69, that are carried by the plunger and engage a cross-bar 70, by which the valve 61 is carried. This cross-bar fits in a slot 71 in the frame, by which it is guided and confined to a strictly rectilinear movement. The movement of the valve 61 to closed position is produced by springs 72, which are interposed between the bar 70 and bracket-arms 73, carried by the frame.

The bottom 74 of the hopper slopes toward the apron and is provided with openings 75 for the passage of the buckets 57, each of these openings being normally closed by a valve 76 under the influence of a spring 77. The valves 76 are so disposed that when the buckets come in contact with them they will yield and permit the buckets to pass, after which the springs restore the valves to closed positions, their movement in this direction being limited by stops 78. It is the practice to wet the raisins before they are seeded, and in order to permit the surplus water to drain off the bottom of the hopper is made of perforated sheet metal or of wire-gauze.

As the fruit is discharged by the ejector 5 it falls onto a chute 79, which is made of wire-gauze and is pivoted at its upper end to the frame, as shown at 80, its lower end being pivoted to the lower end of a pitman 81, whose upper end fits on a wrist-pin 82, carried by the fly-wheel 20. The object in making the chute of wire-gauze is to permit water dropping from the seeding devices to fall into a pan 83, and the object in shaking the chute 79 is to feed the seeded raisins into a receptacle 84.

In order to more permanently unite the pins of which the pulp-receiver is made and the backing in which they are set, the pins are plated with tin or some other suitable metal before they are inserted in the molten metal of which the backing is made, this backing being preferably made of type-metal.

I have described the part which carries the single tappet 37 as being the driving part and the part which carries the two tappets 35 36 as being the driven part, but it is manifest that the same results would follow a reversal of these conditions.

Having thus described my invention, the following is what I claim as new therein and desire to secure by Letters Patent:

1. In a fruit-seeder, the combination of a pulp-receiver having interstices insufficient to admit the seeds, a revoluble part by which it is carried, an elastic impaling device, a plunger by which it is carried, means for reciprocating the plunger, means for confining the plunger to movement in a direction that is transverse to the axis of the revoluble part aforesaid and means for removing the seeds from the outer surface of the pulp-receiver, substantially as set forth.

2. In a fruit-seeder, the combination of a pulp-receiver having interstices insufficient to admit the seeds, a revoluble part by which it is carried, means for intermittently revolving said part, an elastic impaling device, a plunger by which it is carried, means for reciprocating the plunger, means for confining the plunger to movement in a direction that is transverse to the axis of the revoluble part aforesaid and means for removing the seeds from the outer surface of the receiver, substantially as set forth.

3. In a fruit-seeder, the combination of a plunger, means for reciprocating it, an elastic impaling device carried by the plunger, a plurality of pulp-receivers having interstices insufficient to admit the seeds, a revoluble part by which they are carried, means for intermittently revolving said part so as to bring first one and then another of the pulp-receivers to operative position with relation to the plunger, means for confining the plunger to movement in a direction that is transverse to the axis of the revoluble part aforesaid, and means for removing the seeds from the outer surfaces of the pulp-receivers, substantially as set forth.

4. In a fruit-seeder, the combination of a revoluble part, a pulp-receiver carried thereby and consisting of a number of parallel pins disposed transversely to the axis of said part, means for impaling the pulp upon the pins of the pulp-receiver, and means for ejecting the pulp, substantially as set forth.

5. In a fruit-seeder, the combination of a revoluble part, a pulp-receiver carried thereby and consisting of a number of parallel pins disposed transversely to the axis of said part, an impaling device, a plunger by which it is carried, means for reciprocating the plunger and means for confining the plunger to movement in a direction that is transverse to the axis of the revoluble part aforesaid, substantially as set forth.

6. In a fruit-seeder, the combination of a revoluble part, a plurality of pulp-receivers carried thereby, each of said pulp-receivers consisting of a number of parallel pins disposed transversely to the axis of said part, means for impaling the pulp upon the pulp-receivers, and means for revolving the part by which the pulp-receivers are carried, substantially as set forth.

7. In a fruit-seeder, the combination of a revoluble part, a plurality of pulp-receivers carried thereby, each of said pulp-receivers consisting of a number of parallel pins disposed transversely to the axis of said part, an impaling device, and means for intermittently revolving said part, so as to bring first one and then another of the pulp-receivers to position for coöperating with said impaling device, substantially as set forth.

8. In a fruit-seeder, the combination of a revoluble part, a pulp-receiver carried thereby and consisting of a number of parallel pins disposed transversely to the axis of said part and terminating at their outer ends in the same plane, means for impaling the pulp upon the pins of the pulp-receiver, and means for revolving the part by which the pulp-receiver is carried, substantially as set forth.

9. In a fruit-seeder, the combination of a revoluble part, a plurality of pulp-receivers carried thereby, each of said pulp-receivers consisting of a number of parallel pins disposed transversely to the axis of said part and terminating at their outer ends in the same plane, means for impaling the pulp upon the pins of the pulp-receivers, and means for intermittently revolving the part by which the pulp-receivers are carried, substantially as set forth.

10. In a fruit-seeder, the combination of a revoluble part, a plurality of pulp-receivers carried thereby, each of said pulp-receivers consisting of a number of parallel pins disposed transversely to the axis of said part and terminating at their outer ends in the same plane, an elastic impaling device, a plunger by which it is carried, means for reciprocating the plunger, means for intermittently revolving the part by which the pulp-receivers are carried so as to bring first one and then another of them to operative position with relation to the plunger, and means for confining the plunger to movement in a direction that is parallel with the pins of the pulp-receiver which is for the time being in operative position with relation thereto, substantially as set forth.

11. In a fruit-seeder, the combination of a revoluble part, a pulp-receiver carried thereby and consisting of a number of parallel pins disposed transversely to the axis of said part and terminating at their outer ends in the same plane, means for impaling the pulp upon the pins of the pulp-receivers, a seed-scraper, and means for causing the seed-scraper to follow the surface of the pulp-receiver, substantially as set forth.

12. In a fruit-seeder, the combination of a cylinder, a pulp-receiver consisting of a number of parallel pins disposed transversely to the axis of the cylinder, said cylinder having a recess in which the pulp-receiver is arranged, so that the surfaces of the pulp-receiver and cylinder are flush, means for revolving the cylinder, and means for impaling the pulp upon the pins of a pulp-receiver, substantially as set forth.

13. In a fruit-seeder, the combination of a cylinder, a plurality of pulp-receivers carried thereby, consisting of a number of parallel pins disposed transversely to the axis of said cylinder, the cylinder having recesses in which the pulp-receivers fit so that the surfaces of the cylinder and pulp-receivers are flush, means for impaling the pulp upon the pins of the pulp-receivers, and means for revolving the cylinder, substantially as set forth.

14. In a fruit-seeder, the combination of a cylinder, a pulp-receiver carried thereby, consisting of a number of parallel pins, said cylinder having a recess in which the pulp-receiver is arranged so that the surfaces of the cylinder and pulp-receiver are flush, the pins of the pulp-receiver being set in circumferential rows and the cylinder being provided with circumferential grooves registering with the spaces between the rows of the pins, means for impaling the pulp upon the pins of the pulp-receiver, means for revolving the cylinder, and a pulp-ejector consisting of a number of blades occupying the grooves of the cylinder, substantially as set forth.

15. In a fruit-seeder, the combination of a cylinder, a plurality of pulp-receivers carried thereby, each consisting of a number of parallel pins disposed transversely to the axis of said cylinder, the cylinder being provided with recesses in which the pulp-receivers are arranged so that the surfaces of the cylinder and pulp-receiver are flush, the pins of the pulp-receivers being disposed in circumferential rows and the cylinder being provided with circumferential grooves registering with the spaces between the rows of pins, an impaling device, a plunger by which it is carried, means for reciprocating the plunger, means for intermittently revolving the cylinder so as to bring first one and then another of the pulp-receivers in position to coöperate with the impaling device, and a pulp-ejector consisting of a number of blades occupying the grooves of the cylinder, substantially as set forth.

16. A pulp-receiver for fruit-seeders, made up of a number of pins set in a backing of metal while the latter is in a molten state, the embedded portions of the pins being plated before setting them, substantially as set forth.

17. In a power-transmitting device, the combination of a shaft having a tappet, a fixed sleeve through which the shaft passes eccentrically, said sleeve being cylindrical on its exterior, a wheel journaled upon the cylindrical exterior of the sleeve, and a plurality of tappets carried by the wheel and disposed in the path of the tappet carried by the shaft, so that first one and then another of the tappets carried by the wheel will be engaged by the tappet carried by the shaft, substantially as set forth.

18. In a fruit-seeder, the combination of an elastic pad, a plunger by which it is carried, a shaft parallel with the working face of the pad, means moved by the shaft for reciprocating the plunger in a direction transverse to the shaft, a part revoluble about an axis parallel with the shaft, means for intermittently transmitting movement from the shaft to the revoluble part, and a pulp-receiver carried by the revoluble part and adapted to coöperate with the elastic pad carried by the plunger, substantially as set forth.

19. In a fruit-seeder, the combination with the coöperating seeding devices of a chute for conveying thereto the fruit to be seeded, a valve located immediately above and within a short distance of the seeding devices for arresting the fruit, and means for operating the valve, substantially as set forth.

20. In a fruit-seeder, the combination with the coöperating seeding devices, of a chute for conveying thereto the fruit to be seeded, said chute being divided into a number of compartments extending to the bottom thereof, a valve common to all of said compartments located at the bottom of the chute and adapted to close it, and means for operating the valve, the valve being located immediately above and within a short distance of the seeding devices, substantially as set forth.

21. In a fruit-seeder, the combination with the coöperating seeding devices and a plunger by which one of them is carried, of a chute for conveying to them the fruit to be seeded, a valve located immediately above the seeding devices for arresting the fruit, and means carried by the plunger for withdrawing the valve at the desired instant, substantially as set forth.

22. In a fruit-seeder, the combination with the coöperating seeding devices and a plunger by which one of them is carried, of a chute for conveying to them the fruit to be seeded, a valve located immediately above the seeding devices for arresting the fruit, a spring for holding the valve normally closed, and means carried by the plunger for opening the valve, substantially as set forth.

23. In a fruit-seeder, the combination with the coöperating seeding devices, of a hopper for containing fruit to be seeded, a number of cups or buckets arranged side by side in a row or series, means for moving the cups or buckets upward through the body of the fruit in the hopper, means for shaking the cups or buckets and means for causing them to discharge, substantially as set forth.

24. In a feeder, the combination of a hopper, an endless belt or apron, a number of cups or buckets arranged thereon side by side in a row or series, means for moving the apron so as to cause the cups or buckets to move upward through the body of fruit in the hopper, and means for shaking the cups or buckets, substantially as set forth.

25. In a feeder, the combination of a hopper, an endless belt or apron, means for moving it, a slat or bar disposed transversely with relation to the apron, means for securing the slat or bar to the apron so that it is capable of endwise reciprocation, a number of cups or buckets carried by the slat or bar, and means for reciprocating the slat or bar endwise, substantially as set forth.

FRANK H. CHASE.

Witnesses:
L. M. HOPKINS,
N. C. GRIDLEY.